United States Patent [19]

Schwarz

[11] Patent Number: 4,492,093
[45] Date of Patent: Jan. 8, 1985

[54] HEAT EXCHANGER SYSTEM

[75] Inventor: Alois Schwarz, St. Johann in Tirol, Austria

[73] Assignee: ID-Energiesysteme Gesellschaft m.b.H., St. Johann in Tirol, Austria

[21] Appl. No.: 516,135

[22] Filed: Jul. 21, 1983

[30] Foreign Application Priority Data

Jul. 21, 1982 [AT] Austria .................................. 2825/82

[51] Int. Cl.$^3$ ............................................. F25B 27/02
[52] U.S. Cl. ..................................... 62/238.6; 237/2 B
[58] Field of Search ......................... 62/238.6; 237/2 B

[56] References Cited

U.S. PATENT DOCUMENTS

| 2,042,812 | 6/1936 | Tull et al. | 62/4 |
| 2,125,842 | 8/1938 | Eggleston | 62/115 |
| 3,513,663 | 5/1970 | Martin, Jr. et al. | 62/238.6 X |
| 4,089,667 | 5/1978 | Jonsson | 62/238 |
| 4,173,872 | 11/1979 | Amthor, Jr. | 62/238.6 |
| 4,254,630 | 3/1981 | Geary | 62/79 |
| 4,293,323 | 10/1981 | Cohen | 62/238.6 |
| 4,299,098 | 11/1981 | Derosier | 62/238.6 |
| 4,327,561 | 5/1982 | McNeal et al. | 62/238.6 X |
| 4,356,706 | 11/1982 | Baumgarten | 62/238.6 |

FOREIGN PATENT DOCUMENTS

| 2604942 | 8/1977 | Fed. Rep. of Germany . |
| 2468084 | 5/1981 | France .............................. 62/238.6 |

Primary Examiner—Lloyd L. King
Attorney, Agent, or Firm—Flynn, Thiel, Boutell & Tanis

[57] ABSTRACT

A heat exchanger system includes a boiler and a double sleeve pipe which is disposed in the boiler and has coaxial inner and outer pipes. The inner pipe is connected to a heat pump, and carries a first fluid medium. The outer pipe is connected to a fluid circuit which includes a pump and a three-way valve. The three-way valve can selectively connect into the fluid circuit a further three-way valve and a heating system, and the further three-way valve can selectively connect a further boiler into the fluid circuit. The inner surface of the inner pipe is preferably ribbed, and there is preferably at least one longitudinally extending wall in the inner pipe which divides it into two or more separate channels.

8 Claims, 3 Drawing Figures

4,492,093

HEAT EXCHANGER SYSTEM

FIELD OF THE INVENTION

The invention relates to a heat exchanger system and, more particularly, to such a system for heating up service water contained in a boiler by means of a heat source arranged outside of the boiler, for example a heat pump, whereby the heat by means of a first carrier medium is moved into a heat storage reservoir such as the boiler or out of same and can pass heat to a second carrier medium or receive heat from same using a double sleeve pipe, through the inner pipe of which flows the first carrier medium.

BACKGROUND OF THE INVENTION

It is known to supply heat to boilers for heating hot service water, for example by means of heat pumps. The conveying of the heat from the heat pump into the boiler occurs through a cooling medium or refrigerant, which can for example be obtained in commerce under the names FRIGEN or GLYKOL. Since these cooling mediums are highly poisonous, measures must be taken in order to be able to prevent with certainty any part of the cooling medium from leaking into the water which is provided in the boiler. For this reason, the heating coil which is connected to the heat pump is constructed as a double sleeve pipe, the outer side of the inner pipe having webs which engage the inner wall of the outer pipe. The remaining space between the outer and inner pipes is filled with air. Through this construction, however, only limited heat transfer can be achieved, and such heat exchangers thus have a very poor efficiency.

SUMMARY OF THE INVENTION

Accordingly, a basic purpose of the invention is to provide a heat exchanger through which, on the one hand, the necessary safety with respect to preventing leakage of the first carrier medium into the second carrier medium is assured and, on the other hand, a good heat transfer between the two carrier mediums is assured. This is achieved inventively by providing in the outer pipe of the double sleeve pipe a third carrier medium, for example water, which can be conveyed in a fluid circuit by means of a pump. The double sleeve pipe gives effective protection against leakage of the first carrier medium into the second carrier medium. Through the third carrier medium which flows in the outer pipe, the necessary heat transfer between the first carrier medium which flows in the inner pipe and the second carrier medium which receives the heat or which gives off the heat is assured.

A three-way valve is arranged advantageously in the fluid circuit for the outer pipe, through which valve the fluid circuit for the outer pipe can be connected to at least one heating system which includes devices, for example radiators, which give off heat or devices, for example collectors, which receive heat. It is hereby possible, in a situation in which the amount of heat given off by the heat source is greater than necessary, for example greater than needed for heating up the water which is contained in the boiler, for the excess heat to be transmitted through at least one fluid circuit to heating radiators. If however, the heat is only sufficient to cover the absolutely minimum need, for example to heat up the water which is in the boiler, then the conveying of the third carrier medium which is provided in the outer pipe occurs in the shortest fluid circuit.

According to an alternative, one can provide a second three-way valve through which the circuit for the outer pipe of the double sleeve pipe can be connected to a further device, for example a heating boiler for a central heating system. Thus, the water which is in the boiler can be heated up either by excess heat from the heat source of, in the case where the heat source, in particular a heat pump, is not emitting heat, by the heat from the heating system boiler.

If desired, at least one further heating device, such as an electrical heating cartridge or a heating spiral which is coupled to a solar system, is arranged in the boiler. Furthermore, the inner pipe can be divided into several separate channels and can be constructed with ribs or the like on its inner surface.

BRIEF DESCRIPTION OF THE DRAWINGS

The subject matter of the invention is discussed in greater detail hereinafter in connection with an exemplary embodiment which is illustrated in the drawing, in which.

DETAILED DESCRIPTION

Figure 1:
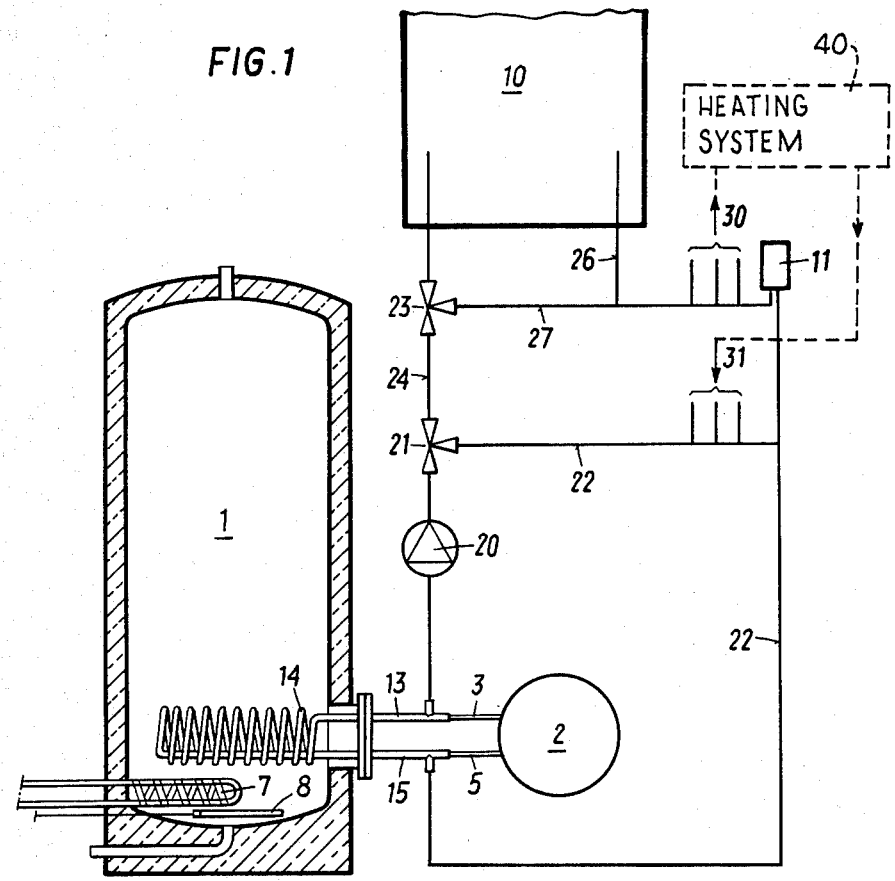
FIG. 1 schematically illustrates a system embodying the invention, including a boiler with connections to a heating system.
Figure 2:
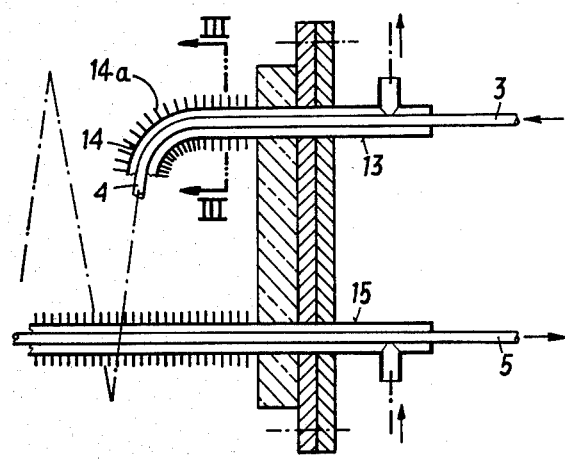
FIG. 2 is an enlarged sectional view of a portion of FIG. 1.

FIG. 1 of the drawing illustrates a hot water boiler 1, which can be heated by means of a heat pump 2, as follows. A first carrier medium, for example a gas which is commercially available under the name FRIGEN or an antifreeze medium which is commercially available under the name GLYKOL, is heated up in the heat pump 2, is guided through a pipeline 3 to a spiral pipe 4 (FIG. 2) which is provided in the boiler 1 and, after it has given up its heat to a fluid in the boiler 1, is returned to the heat pump 2 through a pipeline 5. Water is the fluid in the boiler 1, and serves as a second carrier medium. The flow line 3 for the first carrier medium, the spiral pipe 4 and the return flow line 5 for the carrier medium are respectively surrounded by outer pipes 13, 14 and 15 (FIG. 2.). The outer pipe 13 is connected through a pump 20, a three-way valve 21 and a short pipe 22 to the outer pipe 15. The third connection of the three-way valve 21 is guided through a line 24 to a second three-way valve 23, one connection of which leads to a heating system boiler 10. A flow line 26 is connected to the boiler 10, which flow line 26 feeds at least one heat flow line 30 for a conventional heating system 40, which may include conventional heat radiators or collectors. The heat return lines 31 from the system 40 terminate into the line 22. Through the second connection of the three-way valve 23, the boiler 10 can be short-circuited through a line 27.

Figure 3:
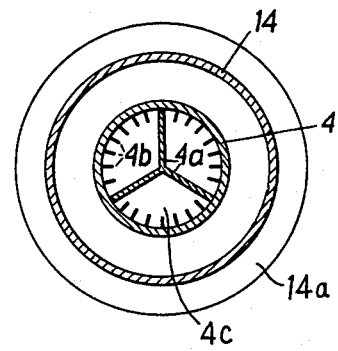
FIG. 3 is a sectional view taken along the line III—III of FIG. 2.

A relief register 11 is furthermore provided in the system. A heating spiral 7, which is operatively coupled to a conventional and not illustrated solar heat collecting system, and an electrical heating cartridge 8 can furthermore be provided in the boiler 1. As can also be seen from FIG. 3, the inner pipe 4 can be divided into separate channels 4c by radially extending inner walls 4a. In addition, the inner surface of the inner pipe 4 is constructed with profilings, for example with ribs 4b.

If desired, axially spaced and radially outwardly projecting fins 14a can be provided on the exterior surface of the outer pipe 14.

The above-described system operates as follows. The first carrier medium is heated in and conveyed from the heat pump 2 through the line 3 to the spiral pipe 4, where it passes on its heat to the second carrier medium which is contained in the boiler 1 and then returns through the line 5 to the heat pump 2. A third carrier medium such as water is conveyed by the pump 20 through the lines 22, 15, 14 and 13 in counterflow, or in other words in a direction opposite the direction of flow of the first fluid medium through the pipes 3, 4 and 5. Through this fluid movement, an optimum heat transfer from the carrier medium in line 4 to the carrier medium in outer pipe 14 is assured, which causes the heat which is conveyed by the first carrier medium to be passed on with minimal losses through the ribbed outer pipe 14 to the second carrier medium which is provided in the boiler 1.

So long as the water which is contained in the boiler 1 has a temperature less than a selected value, for example 40° C., the third carrier medium is moved by means of the pump 20 through the three-way valve 21 and the line 22 in a fluid circuit of relatively short length. However, if the temperature in the boiler 1 exceeds the selected temperature value, the three-way valve 21 can be switched so that the carrier medium flowing through the lines 15, 14 and 13 is conveyed through the line 24 and the three-way valve 23 and either through the line 27 or through the boiler 10 to the heat flow lines 30 to heating system 40 and, through this, can be utilized for heating rooms.

The heating of the boiler 1 can alternatively be done by means of the heating spiral 7 of the solar heat system, or by means of the electric heating cartridge 8. If no heat is given off by the heat pump 2, it is also possible to heat up the water which is contained in the boiler 1 by transferring heat from the water in the boiler 10.

The double sleeve pipe arrangement 3, 4, 5, 13, 14 and 15 prevents even a small amount of the first carrier medium from leaking into the second carrier medium provided in the boiler 1. Through the third carrier medium which is conveyed through the outer pipes 13, 14 and 15, an optimum heat transfer from the first carrier medium contained in the inner pipe 3 to the second carrier medium contained in the boiler 1 is assured. In addition, the second carrier medium which is contained in the boiler 1 represents a balancing heat storage reservoir, through which the switching frequency of the heat pump 2 is reduced.

Due to the described coupling of the various different heat sources, it is possible for a heat transfer or a heat exchange in almost any direction to occur between the various devices of the system.

On the one hand, for example, excessive heat from the boiler 1 can be transferred to the heating system. On the other hand, the boiler 1 can be supplied with heat from the heating system. Finally, it is possible to supply heat to the system from the heat pump 2, from the solar heating system and/or from the electrical heating cartridge, in order to make a freezing up of the heating system impossible.

Thus, the invention relates generally to the provision of a heat exchanger in which a secure separation of the first and second carrier mediums is achieved and, regardless of such separation, a very good heat transfer between the first and the second carrier mediums is achieved by guiding between these two carrier mediums a third carrier medium, preferably in counterflow thereto.

The effective cross-sectional area of the central opening in the outer pipe 14, or in other words the difference between the cross-sectional area of the central opening therein and the cross-sectional area of the pipe 4, must be sufficiently great so that the heat which is produced in the heat pump 2 or the heat which is produced in the boiler 1 by the other heat sources can be discharged through the pipes which go off to the heating system 40. Advantageously, the cross sections of the pipes 4 and 14 of the double sleeve are sized so that the effective cross section of the outer pipe 14 is at least as large as the effective cross section of the inner pipe 4. The effective cross section of the outer pipe 14 is preferably about twice as large as the effective cross section of the inner pipe 4.

The inner pipe 4 can, if desired, be divided by longitudinally extending walls 4a into channels 4c, and the supply of heat through such channels can occur from respective heat sources, or the received heat can be fed through the individual channels to respective consumers. The division of the pipe 4 into separate channels is also advantageous because it is then possible to use in the respective individual fluid circuits plural types of first carrier mediums, for example a liquid and a gas.

Although a particular preferred embodiment of the invention has been disclosed in detail for illustrative purposes, it will be recognized that variations or modifications of the disclosed apparatus, including the rearrangement of parts, lie within the scope of the present invention.

The embodiment of the invention in which an exclusive property or privilege is claimed are defined as follows:

1. A heat exchanger apparatus, comprising: a container containing a quantity of a liquid; a heat source arranged outside of said container; a pipe arrangement which is disposed within said container and includes an outer pipe and an inner pipe, said inner pipe being disposed within said outer pipe; first fluid circuit means for effecting fluid communication between said inner pipe and said heat source and for causing a first fluid to flow through said inner pipe and to carry heat from said heat source to said pipe arrangement and to discharge the heat through said pipe arrangement to said liquid in said container; pump means; second fluid circuit means for providing fluid communication between said pump means and said outer pipe, said pump means causing a second fluid to flow through said outer pipe in a direction opposite the direction in which said first fluid flows through said inner pipe; inwardly projecting rib means provided on an inner surface of said inner pipe; and outwardly projecting rib means provided on an outer surface of said outer pipe.

2. The apparatus according to claim 1, wherein said second fluid circuit means includes a first three-way valve which can selectively effect fluid communication between said second fluid circuit means and third fluid circuit means which includes a radiator.

3. The apparatus according to claim 2, wherein said third fluid circuit means includes a second three-way valve which can selectively effect fluid communication between said third fluid circuit means and a boiler of a heating system.

4. The apparatus according to claim 1, including a heating device provided in said container.

5. The apparatus according to claim 4, wherein said heating device is an electrical heating device.

6. The apparatus according to claim 4, wherein said heating device is a heating coil adapted to be operatively connected to a solar heat system.

7. The apparatus according to claim 1, wherein the effective cross section of said outer pipe of said pipe arrangement is at least as large as the effective cross section of said inner pipe thereof.

8. The apparatus according to claim 1, wherein said inner pipe is divided into plural separate channels by longitudinally extending walls provided therein.

* * * * *